Figure 1:
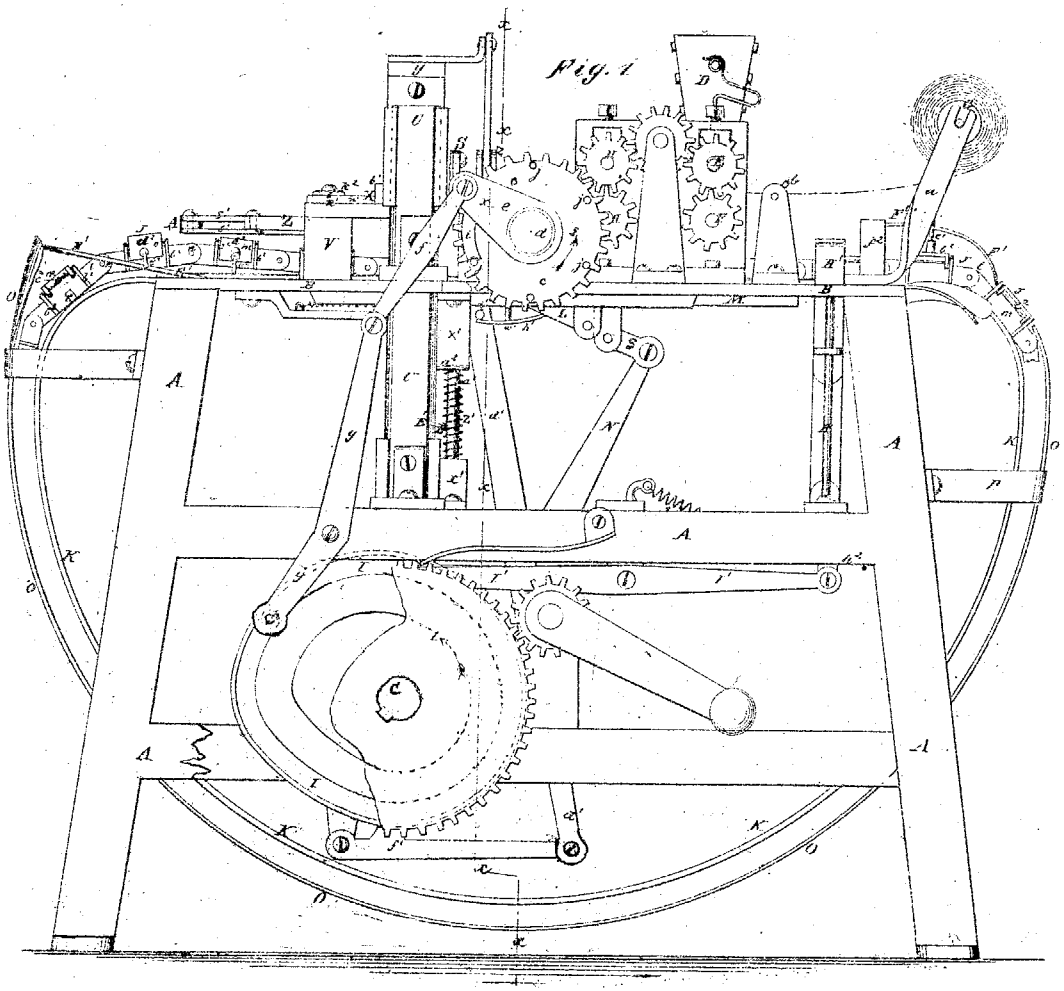

4 Sheets--Sheet 1

F. GATES.

Paper-Box Machines.

Reissue No. 6,245.

Reissued Jan. 19, 1875.

William Gates
Agent of
Frank Gates
Inventor

4 Sheets--Sheet 2.

F. GATES.

Paper-Box Machines.

No. 6,245. Reissued Jan. 19, 1875.

Witnesses.
John F. Sheldon
Walter Deuel

William Gates
Assignee of
Fred'k Gates
Inventor.

F. GATES.

Paper-Box Machines.

No. 6,245.

Reissued Jan. 19, 1875.

Witnesses.
John F. Sheldon
Walter Deuel

William Gates
Assignee of
Fred'k Gates
Inventor.

F. GATES.
Paper-Box Machines.
No. 6,245. Reissued Jan. 19, 1875.
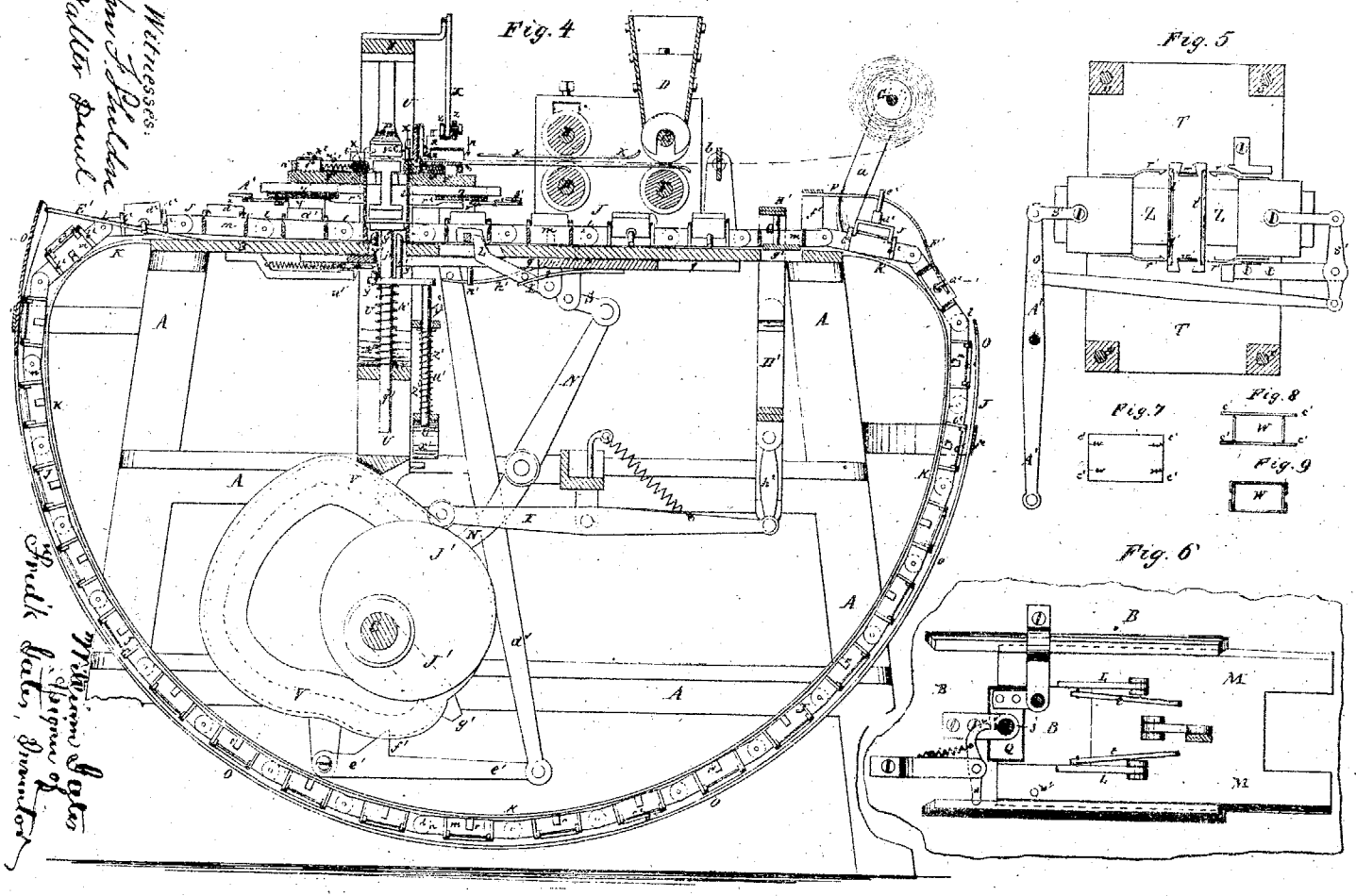
Witnesses:
John F. Shulder
Walter Daniel
William Gates
Assignee of
Fredk Gates, Inventor

BEST AVAILABLE COPY

UNITED STATES PATENT OFFICE.

FREDERICK GATES, OF FRANKFORT, NEW YORK, ASSIGNOR TO WILLIAM GATES, OF SAME PLACE.

IMPROVEMENT IN PAPER-BOX MACHINES.

Specification forming part of Letters Patent No. 101,455, dated April 5, 1870; reissue No. 6,245, dated January 19, 1875; application filed September 18, 1874.

*To all whom it may concern:*

Be it known that FREDERICK GATES, now of Frankfort, in the State of New York, has invented certain new and useful Improvements in Paper-Box Machines; and I do hereby declare the following to be a full, clear, and exact description of the same, reference being had to the drawings accompanying and forming a part of this specification.

The invention consists, first, in combining, with an inserting-plunger or box-transferring mechanism of a box-forming mechanism, a series of box receiving and retaining receptacles, by means of which the partly-finished box is received from the box-forming mechanism and retained after the application of paste to its edges or corners, to enable it to become sufficiently dry before being delivered from the machine; second, in combining, with an inserting-plunger or box-transferring mechanism of a box-forming mechanism, a series of box receiving and retaining receptacles, a discharging mechanism for the purpose of discharging the boxes from the said receivers after the pasted portions of the boxes have become sufficiently dry; third, in arranging on the sides of these receptacles folding-plates, which are turned in to hold the gummed parts of the paper boxes securely together while they are in the receptacles to be dried, and which folding plates are swung out of the way when the boxes are to be discharged; fourth, in providing stationary plates, by which the aforesaid folding-plates of the receptacles are automatically swung in and out as the series of receptacles is in motion; fifth, in a novel mechanism for propelling the series of receptacles by means of a series of dogs attached to a horizontal plate; sixth, in the application of a reciprocating plunger, follower, and of side and end pieces or molds for forming a paper or pasteboard box; seventh, in a peculiar mode of combining the incisor, knives, and the blank-cutters; eighth, in the application of wire or slotted guides, on which the pasteboard or paper is supported during its passage from the feed-rollers to the cutting and molding apparatus, in combination with the feed-rollers set a convenient distance from the cutting apparatus to push the material toward the same; ninth, in the mechanism for operating the cutting-knife, whereby the same is thrown up immediately after having made an incision to allow the material to be moved forward after having been cut; tenth, in providing springs on the beds of the nicking-knives, to prevent them pushing the edges of the material down, said springs supporting and holding up the material while the knives pass through it; eleventh, in so attaching the end and side pieces of the mold that they can be readily removed and replaced; twelfth, in making the aforesaid end and side pieces of the mold so that they can slide, and in providing them with springs to have them pushed against the plunger while the same moves down, to hold the turned-up sides of the box in the proper vertical position; thirteenth, in the application of stationary side and end pieces below the sliding ones, for holding the sides of the box firmly against the plunger, and for preventing the plunger from drawing the box up again after said box has been deposited in the series of receptacles; fourteenth, in providing a series of horizontal folders, which turn the extremities of the sides of the box around the ends of the box, so that the parts thus folded will, when pasted to the ends, retain them and the sides in an upright position; fifteenth, in providing a mechanism for arresting the follower when it is pushed down, to allow the receptacles, with the newly-formed box, to pass over it, and in the use of devices for again disengaging the same when another receptacle has arrived over it; sixteenth, in combining the forming perforated plunger with a recessed follower, so that the box will not be apt to be dawn up.

Figure 2:
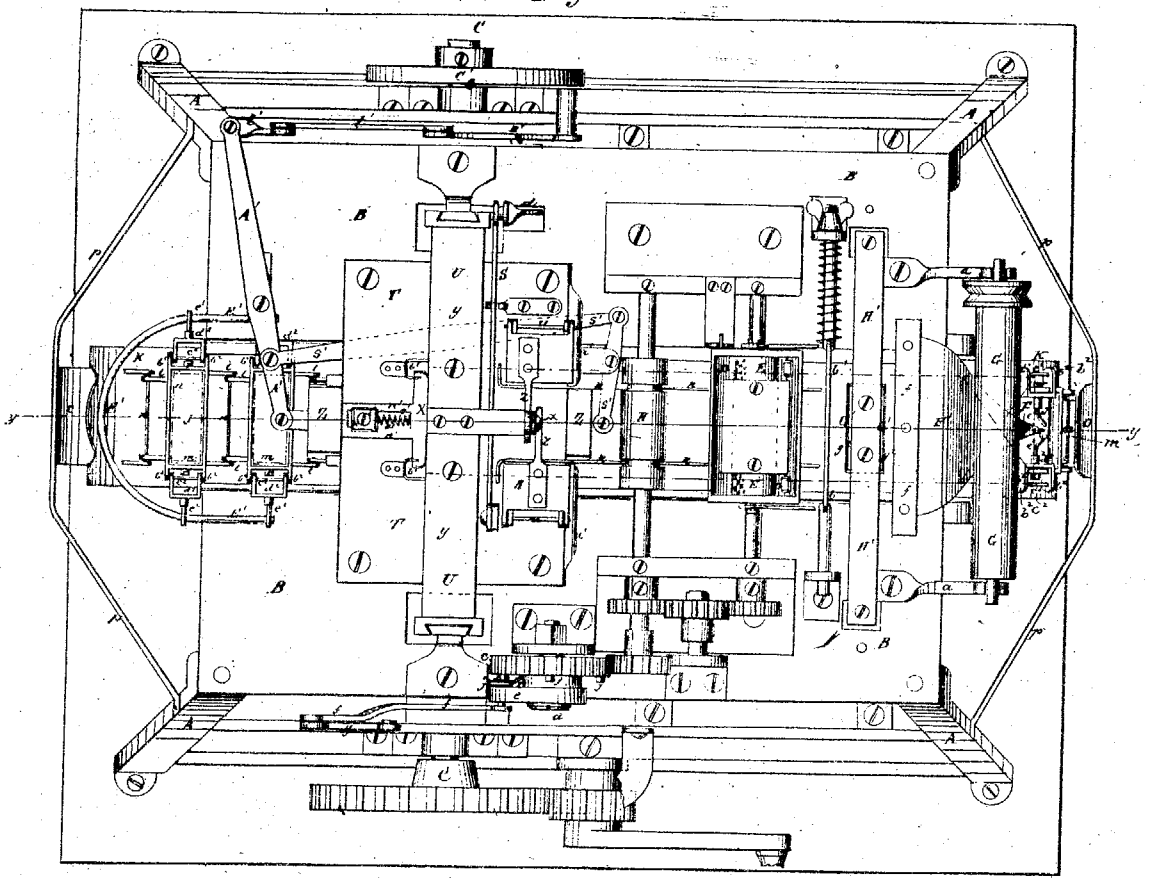
Figure 3:
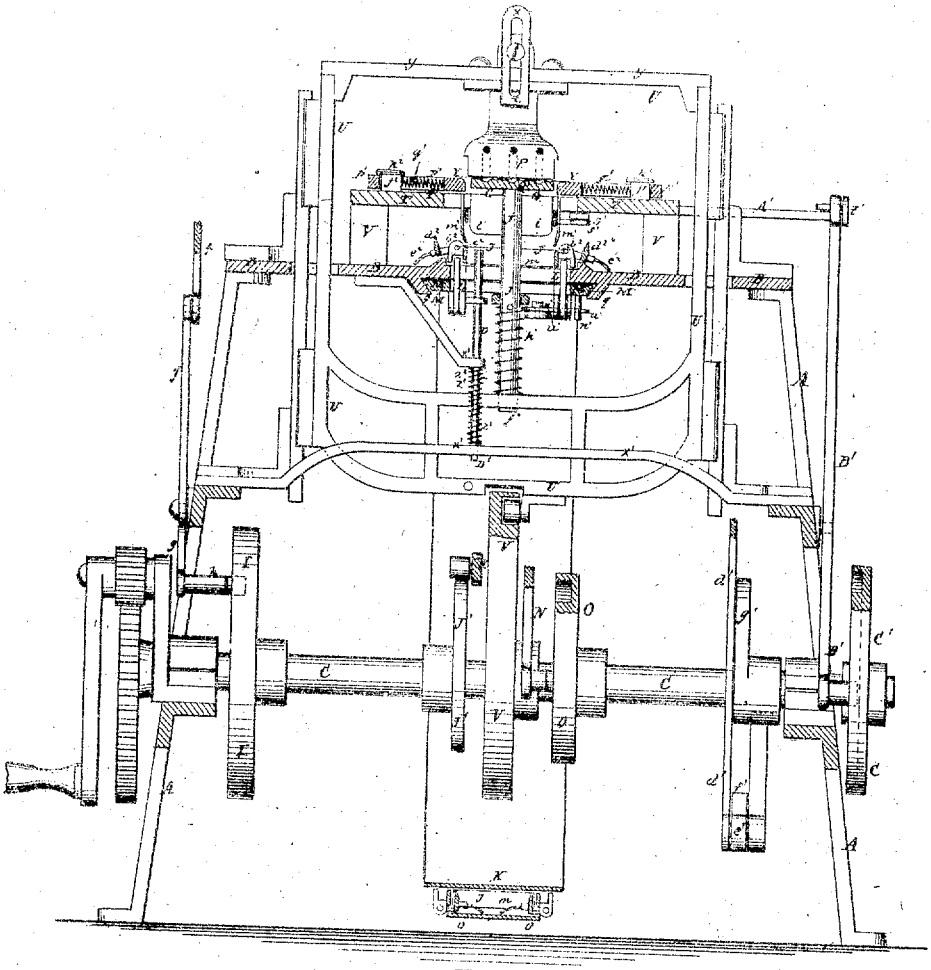
Figure 10:
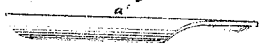

In the accompanying drawings, serving to illustrate the improvements, Figure 1, Plate 1, represents a side elevation of a paper-box machine. Fig. 2, Plate 2, is a plan or top view of the same. Fig. 3, Plate 3, is a vertical transverse section of the same, the plane of section being indicated by the line *x x*, Fig. 1. Fig. 4, Plate 4, is a vertical longitudinal section of the same, the plane of section being indicated by the line *y y*, Fig. 2. Fig. 5, Plate 5 is a detail inverted-plan view of the plate in that supports the molding apparatus.

Fig. 6, Pl. 4, is an inverted-plan view of the feeding-plate, and of the device for holding the follower down. Fig. 7, Plate 4, is a detail face view of a separated sheet from which the box is to be formed. Fig. 8, Plate 4, is a detail plan view of a box whose sides and ends are turned up, but which has the side pieces not bent in. Fig. 9, Plate 4, is a detail plan view of a finished box as made on the machine.

A represents the frame of the machine containing such improvements. It consists of suitable upright and horizontal side and cross bars, and supports a horizontal platform, B, upon which the main mechanism of the machine is secured. The horizontal driving-axle C has its bearings in the lower part of the frame A, and receives rotary motion, in the direction of the arrow, 1, by suitable means. Upon the platform B is placed, near one end, the gum or paste box D, which is to deliver adhesive gum to a roller, E, that has its bearings in ears projecting from the platform directly above another similar roller, F, as shown in Fig. 4. The pasteboard, straw-board, or other material from which the boxes are to be made, is wound upon a roller, G, that has its bearings in bars *a*, that project from the frame, as shown, said roller G being in rear of the gum-rollers. The main feed-rollers H H are in front of the gum-rollers, and on about the same plane with them. The material from the roller G passes first through a slotted guide-plate, *b*; then between the rollers E F, to the feed-rollers, which push it forward toward the cutting and folding apparatus. The gum-roller E is protected at the middle, so that it will only come in contact with the gum at the ends, and has small indentations at these ends, which take up the gum to convey it to the pasteboard. The box material will, therefore, only be gummed at the edges and at certain required intervals. The gum and feed rollers receive their motion by suitable intermediate gearing from a toothed wheel, *c*, which is hung at the side of the frame, and which turns loose on its axle *d*, Figs. 1 and 2. A crank, *e*, of said axle is, by means of a rod, *f*, connected with a lever, *g*, which is pivoted to one side of the frame, and which has a projecting pin or roller, *h*, fitting into a cam-groove of an eccentric, I, mounted on the shaft C. The crank *e* has a projecting spring-catch, *i*, working against pins *j*, that project from the wheel *c*. Thus, as by the action of the cam I the lever *g* is oscillated, the crank *e* will also be oscillated, and will impart intermittent rotary motion to the wheel *c* by means of the catch *i* and pins *j*, in the direction of the arrow 2, Fig. 1. Between the gum and feed rollers, and between the latter and the cutting apparatus, the material from the roller G is supported by and guided between slotted bars or double wire rods *k k*, as shown, which allow the feeding apparatus to be placed some distance in rear of the cutting and molding devices. The rollers F and H are grooved to admit these bars *k*. J represents a series of receptacles, which, in the present instance, are constructed as follows: The receptacles *m m* have projecting ears *l l*, through which the connecting-pins *n n* are fitted, as shown. Each receptacle *m* is as large as, and of the form of, a box to be made in the machine.

The series of receptacles so connected is placed longitudinally upon the platform B and around a curved plate, K, suspended from the same, as shown. An outer shield, *o*, secured by braces *p* to the frame A, support these receptacles and protect them under the plate K. From the end of each receptacle *m* projects a small block, *r*. These blocks serve as abutments for the feeding-pawls L, which are pivoted to a sliding plate, M, that is dovetailed between guide-ribs *q q*, Fig. 3, which project from the under side of the plate B, the pawls being held up by springs *t*. The plate M is, by a short link, *s*, Fig. 4, connected with a lever, N, that is pivoted to the frame A. A pin projects from the lower end of the lever N into a cam-groove of an eccentric, O, that is mounted upon the shaft C. As the shaft C revolves the lever N will be oscillated, and will move the plate M backward and forward. During the forward stroke the pawls L, fitting through slots of the plate B, strike the blocks *r* of a receptacle, *m*, and move the series of receptacles forward the length of one such receptacle. Thus the feed of the series is produced. The material from the roller G is, by the feed-rollers, conveyed to the molding apparatus under the reciprocating plunger P. Before reaching the same, however, it is subjected to the action of a pair of cutters, R R, and of a single cutter, S. The cutters R R are, by pins *u u*, pivoted to ears projecting from a platform, T, Fig. 2, that is by posts supported above the main platform B, as shown. The cutters R R are above on opposite sides of the paper or material, and each has two parallel cutting-edges, so as to make two short incisions, *w w*, into each side of the material. The cutters R are actuated by a slotted rod, *x*, which connects them with the upper cross-bar *y*, to which the plunger P is secured. This cross-bar forms part of a vertically-reciprocating frame, U, which rests upon or is actuated by a cam, V, that is mounted upon the shaft C.

Whenever the frame U is drawn down it operates, by means of the rod *x*, the arms *z z* of the cutters R, and forces them thereby into the paper.

The outer—that is, the rear—edge of the elevated platform T carries two springs, $a^1$, which are pushed aside by the cutters R during their descent, and which serve as supports for the paper to be cut. These springs prevent the cut edges of the paper from being carried and bent down by the cutters.

When the incisions *w* have been made by the cutters R the material is fed along under the plunger P until it strikes abutting ears or lugs $b^1$, that project from the platform T, as shown. Then the cutter S is brought down,

BEST AVAILABLE COPY and separates the end of the paper from the roll. The piece thus separated is illustrated in Fig. 7. It is of rectangular form, and has two incisions, *w w*, in each end, equidistant from each side.

The corner flaps $c^1$ formed by the incisions *w* in each blank W are gummed, while the spaces between them are not gummed. The knife S, which is at one end pivoted to the platform or frame, is at the other end connected by a rod, $d^1$, with a pivoted lever, $e^1$, which lever has a projecting arm, $f^1$, that is actuated by a crank, $g^1$, of the shaft C once during every revolution of the latter. Whenever the crank $g^1$ strikes the arm $f^1$ the knife S is suddenly brought down to cut off the blank W. As soon as the crank has passed the arm the knife is at once elevated by a spring, $h^1$, which acts against the under side of a pin, $i^1$, that projects from the rod $d^1$, as shown.

The knife is, by means of this spring $h^1$, raised to clear the material, so that it will not interfere with the further motion of the same.

In the platforms T and B are, directly under the plunger P, rectangular apertures, as large as the outside of the box to be made, while the lower face of the plunger is as large as the inside of said box.

A follower, Q, as large as the apertures in the plates B and T, or smaller, is arranged below the plunger, and has a shank, *j*, reaching downward into a cross-bar of the frame U.

A spiral or other spring, $k^1$, has the constant tendency to elevate the follower, and to hold it against the under side of the plunger. The sides and ends of the apertures through the plate T are extended downward by means of spring-plates *i i* and *m′ m′*, which are somewhat bent inward. Upon the plate T are, at the sides of its apertures, arranged plates or bars X X, which have shanks *n′ n′*, that are fitted into grooved guides, or that, if slotted, as shown, are fitted around guides $i^2$, formed on said plate, and that are forced inward by means of springs *o′ o′*, so that they form yielding sides above the aperture. In a similar manner are yielding ends provided on said aperture by means of plates or bars Y, which, with their shanks *p′*, are fitted into grooved guides, or, when slotted, around inner guides, $j^2$, formed on the plate T, and which are forced inward by springs *q′*. The springs *o′* and *q′* are not very powerful, so that they will allow the plates X and Y to move outward as soon as the plunger moves down. The guides $i^2$ $j^2$ carry projecting top plates $k^2$, which serve as buttons for holding the plates X Y in place. By taking off these buttons the said plates can be readily removed. When a blank, W, has been moved forward against the plates $b^1$ the follower is thrown up by its spring $k^1$, so that its surface will stand flush with that of the plates X Y. The blank is larger than the follower, and rests partly on the plates X Y, as indicated in Fig. 3. A receptacle, *m*, of the series is under the aperture of the plate T, and above that of the plate B.

The cam V now draws down the plunger, which is pressed upon the follower, and which carries the blank down with it. The sides of the blank are thereby turned up with the corner of flaps $c^1$, as in Fig. 8, while the ends are also turned up between the sides, as shown. The aperture in the plate T has longitudinal extensions, to admit the passage of the corner pieces $c^1$. The plates X Y yield to the outward pressure of the plunger, but hold the vertically turned-up sides and ends of the blank close against the sides and ends of the plunger, and cause, by their inward pressure, sharp corners to be made by the plunger. The plunger and follower move steadily down until the face of the latter is a short distance below the lower side of the platform T.

On the under side of the platform T are horizontal slide-plates Z Z, one in front, and one in rear, of the plunger. From each of these slide-plates projects, toward the plunger, a pair of spring-plates, *r′*, as shown in Fig. 5. The plates Z Z are, by means of links *s′ s′*, connected with a pivoted lever, A′, in such manner that, when said lever is swung in the direction of the arrow 3, Fig. 5, they will be moved toward each other. The lever A′ is, by means of rods *t′ t′*, connected with a lever, B, which is pivoted to the side of the machine, and which is oscillated by means of a cam, C′, of the shaft C.

When the follower and plunger are with their faces some distance below the platform T the slides Z are moved inward, so that their plates *r′* will strike against the extremities $c^1$ of the sides of the box, and will fold them over against the ends of the box. These pieces $c^1$, having been gummed, will adhere to the ends, and will, when the gum is dry, retain all parts in the position shown in Fig. 9.

In order to accommodate the folding of the corners $c^1$, the end spring-plates *m′* are made similar to inverted letters T, as shown in Fig. 4, so that the plates *r′* will work above their heads in line with their shanks.

The plates *r′* are, by their slides, at once withdrawn after they have folded the corner pieces $c^1$. The plunger now continues its downward motion until the face of the follower is flush with the platform B, when the box will have been inserted in the receptacle *m* of the series. The follower is now, by a spring-catch, *u′*, that is pivoted to the under side of platform B, as in Fig. 6, and that fits over a shoulder or projecting spring, *v′*, of the shank *j*, locked in this its lowest position, while the plunger again moves up.

The spring-plates *l′ m′* spring in above the edges of the box as soon as the same has been deposited in the receptacle *m* of the series, and hold the box thereby down to prevent its being again drawn up by the ascending plunger. In the face of the follower is or may be formed a small depression, as indicated in Fig. 3, while the plunger is perforated, its apertures extending from the bottom through the sides, as also shown in Fig. 3.

When the plunger moves up the apertures through the plunger prevent the formation of a vacuum under it when it ascends, and the consequent elevation of the box. As soon as the plunger has moved up the series is moved ahead by the pawls L catching against the ears $r$ of one of the receptacles $m$. The box is then carried in its receptacle $m$ away from the follower, and another receptacle, $m$, is brought over the same. As soon as the new box-receptacle has arrived over the follower the catch $u'$ is, by a pin, $w'$, that projects from the slide M, turned so as to release the follower, which is, by its spring $k^1$, or by simple spring action, at once thrown up against the blank, which has in the meantime been deposited on the platform T under the plunger. Under the follower is arranged, in guides $x^2$ $x'$, that project from the under side of the bed B, or from the frame A, a vertical slide-bar, D', which has at its upper end two projecting fingers, $y'$ $y'$, far enough apart to fit against the inner sides of a box-receptacle, $m$. A spring, $s'$, has the tendency to elevate the bar D' in its guides. When, after the series has made a motion, the follower is thrown up by the spring $k^1$, the bar D' is also thrown up, so that its fingers fit into a box-receptacle, $m$, as indicated in Fig. 4. These fingers have rounded ends, and will adjust the receptacle $m$ in the proper position under the plunger, so that the place for the next box will be clearly defined. The upward motion of the bar D' is arrested by a shoulder or projection, $a^2$, of the latter striking against one of the guide-arms $x'$. When the follower is pushed down by the plunger it strikes against the upper ends of the fingers $y'$, and forces them down with it, and holds them down under the platform, while it is locked by the catch $u'$. The adjusting-fingers are thus out of the way while the series of receptacles receives the box and during the motion of the series; but as soon as the pawls L have pushed the series their slide liberates the follower, and the finger spring up under the follower to adjust the series in the proper exact position. To the ends of each box-receptacle $m$ of the series are, in ears $b^2$, that project from the series, and by pins $c^2$, pivoted plates $d^2$, that can be swung out, as in Fig. 3, to be out of the boxes or into the same. From each pivoted plate projects a pin, $e^2$. When a receptacle, $m$, receives a box, the plates $d^2$ are swung out, and continue to be so until such receptacle arrives at the forward end of the platform B. There an inclined hoop, E', is arranged on the platform, on which hoop the pins $e^2$ slide up, whereby the plates $d^2$ are gradually swung up and inward until they finally drop into the box. They then serve to hold the ends of the box against the ends of the receptacle, to prevent the end pieces $c^1$ from working loose while the boxes are conveyed along between the plates K and $o$. The boxes, as they pass slowly through this channel with the intermittent motion of the series, will become thoroughly dry, so that they will be complete and perfect when they again arrive at the rear end of the platform B. At the rear end of the platform is supported, on an elevated frame, $f^2$, a backward and downward extending plate, F', which is pointed at its rear end, as shown in Fig. 2. The point of the plate F' fits under the pins $e^2$ of the plates $d^2$ as the same arrive at the rear end of the frame, and as the pins $e^2$ slide up on the inclined plane of the plate F' they are gradually elevated and thrown out, so that the plates $d^2$ will come out of the boxes. The boxes finally arrive over an aperture, $g^2$, of the platform B, and under a plunger, G, which is secured to a vertically-sliding frame, H, that is, by means of a rod, $h^2$, connected with a lever, I', that is pivoted to the frame A, and operated by a cam, J', of the shaft C. When a box arrives at the aperture $g^2$, the plunger G is moved down and discharges it from the machine. Thus, once during every revolution of the shaft C, the cutters R make their incisions, the cutter S separates a blank, the plunger, with the side and end plates X Y $l'$ $m'$, forms a box, and the series conveys one finished box away from the molding apparatus, and carries it to the discharge-opening. All these functions being performed simultaneously, or nearly so, a number of boxes are at once under course of construction, and by the continuous uninterrupted and entirely automatic action of the machine large quantities of boxes can in a short time be made with unusual accuracy, neatness, and dispatch.

It is evident that the operating-cams on the shaft C may be so shaped that the functions of the mechanism may be doubled, trebled, or furthermore increased during one revolution of the shaft, in which case a slower motion of the shaft would be required.

When the material on a roller, G, has been used up, another filled roller is readily put into its place, the bearings in the arm $a$ being open at one end or side, to facilitate the removal and insertion of such rollers.

I claim—

1. The combination, with an inserting-plunger of a box-forming mechanism, of a series of box-receptacles for the reception and retention of the boxes, substantially as described.

2. The combination, with an inserting-plunger of a box-forming mechanism and a series of box-receptacles, of a mechanism for automatically discharging the finished boxes from the box-receptacles, substantially as described.

3. The combination, with the box-receptacles $m$, of folding-plates $d^2$ $d^2$ and the inclines E' F', arranged and operating substantially as described.

4. The combination of the reciprocating plunger P and spring-follower Q with the sliding side and end pieces X Y, stationary spring-plates $l'$ $m'$, and sliding lap-folders $r'$ $r'$, all arranged and operating substantially as herein shown and described.

5. The spring-supports $a^1$ $a^1$, arranged in combination with the nicking-knives R R, substantially as herein shown and described.

6. The side and end pieces X Y of the mold, arranged to slide on the platform T, and pushed in by springs $o'$ $q'$, substantially as herein shown and described, for the purpose of holding the sides and ends of the box firmly and vertically against the plunger.

7. The stationary side and end spring-plates $l'$ $m'$, arranged below the slide-plates X Y, for the purpose of forming the lower part of the mold, and for preventing the ascending plunger from elevating the finished box, as specified.

8. The horizontal folders $r'$ $r'$, in combination with spring-plates $l'$ $l'$ and plunger P, for the purpose of folding the ends of the sides of the box, so that the parts thus folded will secure all the parts of the box in the desired position, as set forth.

9. The spring-catch $w'$, in combination with the pin $w'$, arranged to arrest and disengage the follower, substantially as set forth.

10. The combination of a perforated plunger, P, with a reciprocating follower, Q, recessed upon its face, the latter supporting the blank, and the former bending its sides, while both descend a certain distance together, all as set forth.

WILLIAM GATES.

Witnesses:

WM. B. GATES,

J. F. SHELDON.